United States Patent [19]
Cohen

[11] Patent Number: 5,841,777
[45] Date of Patent: Nov. 24, 1998

[54] SYSTEM AND METHOD FOR ACCOMMODATING ABR AND CBR TRAFFIC ON A SHARED COMMUNICATIONS CHANNEL

[75] Inventor: Reuven Cohen, Haifa, Israel

[73] Assignee: Hewlett-Packard Company, Palo Alto, Calif.

[21] Appl. No.: 707,812

[22] Filed: Aug. 30, 1996

[51] Int. Cl.[6] .............................. H04B 7/212; H04J 3/16
[52] U.S. Cl. ......................... 370/443; 370/447; 370/461; 370/468; 370/477
[58] Field of Search .................................... 370/230, 231, 370/232, 252, 253, 389, 395, 442, 443, 444, 445, 447, 458, 461, 462, 465, 468, 471, 477

[56] References Cited

U.S. PATENT DOCUMENTS

| | | | |
|---|---|---|---|
| 5,247,516 | 9/1993 | Bernstein et al. | 370/468 |
| 5,282,202 | 1/1994 | Bernstein et al. | 370/468 |
| 5,295,140 | 3/1994 | Crisler et al. | 370/458 |
| 5,638,371 | 6/1997 | Raychaudhuri et al. | 370/349 |
| 5,684,791 | 11/1997 | Raychaudhuri et al. | 370/349 |

*Primary Examiner*—Alpus H. Hsu

[57] ABSTRACT

A system and method for managing the bandwidth of a shared communications channel is described. The shared channel connects a master station with a number of client stations. The shared channel supports ABR (Available Bit Rate) data and CBR (Constant Bit Rate) data. The bandwidth is divided by the master station into time slots. The slots are characterized as contention ABR slots, reserved ABR slots, and CBR slots, and are grouped into frames. The ABR slots of each frame form one region of the frame, and the CBR slots of each frame form another region of the frame. As CBR calls are set up and taken down, the CBR region is allowed to grow and contract. Reservation requests for blocks of consecutive ABR slots are made by the client stations in contention ABR slots. The master station may expand the ABR region of a given frame to accommodate such a reservation. If the master station does expand the ABR region, it defers the CBR slots of the same frame, and contracts the ABR region of subsequent frames, accordingly.

7 Claims, 10 Drawing Sheets

SYSTEM AND METHOD FOR ACCOMMODATING ABR AND CBR TRAFFIC ON A SHARED COMMUNICATIONS CHANNEL

FIELD OF THE INVENTION

The present invention relates to data communication, and more particularly to data communication on a shared channel and enabling coexistence of Available Bit Rate (ABR) data and Constant Bit Rate (CBR) data on the shared channel.

BACKGROUND OF THE INVENTION

In many communications media, a large number of stations communicate over a shared channel. Examples of such modes of communication include Hybrid Fiber Coax (HFC) data networks, cellular and wireless (such as Local Multipoint Distribution Service microwave) networks, and satellite communications networks.

One possible architecture for each of these networks is one in which a master station is connected to a large number of client stations via the shared channel. The shared media is divided into two channels: a down-stream channel for communicating control information (and data) from the master station to the client stations, and an up-stream channel for communicating data from the client stations to the master station.

Some of these communications media have tremendous bandwidth as compared to existing dedicated connections technologies. For example, data communication on a channel on an HFC cable can be at about 30 Mbits/sec, which is approximately 1000 times higher than the fastest modems commonly used to communicate via twisted-pair telephone lines.

In the last few years the Internet has had an explosive growth. In is expected that this growth will continue for the foreseeable future. One of the present problems or frustrations with retrieving data from the Internet is the slow connections between user stations and Internet service providers. The Internet is commonly used to view graphics such as photographs, to down-load computer programs, and, sometimes, to receive audio files. These kinds of data are very large. Therefore, when receiving data at the common rates of 28.8 Kbits/sec or 14.4 Kbits/sec the transfer time often exceeds what a user can tolerate. The tremendous bit-rate of HFC-cable modem systems, alleviate that problem.

However, the bandwidth of HFC and other shared communications media technologies, is so great that it goes beyond the requirements needed to solve the bottle-neck described above. It is therefore desirable to use the extra bandwidth for other types of communication, for example, video or voice. Digitized video and voice signals must be transmitted prior to specific deadlines. Failing to meet the required deadlines causes the video or voice streams to not have the continuous flow necessary for accurate reproduction.

Data with deadlines that must be met is referred to as synchronous or Constant Bit Rate (CBR) data. Data that does not have deadlines, i.e., data that can be transmitted when the channel is available, is referred to as asynchronous or Available Bit Rate (ABR) data.

There are several prior art solutions for combining ABR and CBR traffic on a shared data medium. One is to define different physical channels for each traffic type, e.g., using schemes like frequency division multiplexing (FDM) or time division multiplexing (TDM). A deficiency in both FDM and TDM is that these approaches are not sufficiently dynamic to avoid wasting bandwidth that is assigned to CBR data. In response to required demand, it is desirable to use as much of the available bandwidth as possible. It is therefore desirable to avoid having bandwidth reserved for CBR traffic that would not be available for ABR transmissions. Furthermore, it is desirable to be able to use the same equipment for both ABR and CBR data.

In a slotted network, a network in which the bandwidth is divided into time intervals called slots, having a control channel for communicating slot status, it is possible to transmit ABR and CBR traffic in the same physical channel. To this end, the master station marks each slot of the data channel as either a CBR slot or an ABR slot. An asynchronous packet employs only ABR slots. Such a packet will have to be fragmented into several pieces if in the middle of its transmission a burst of one or more synchronous (CBR) slots are scheduled. The fragmentation and re-assembly of ABR packets is expensive in terms of processing and bandwidth resources. It is therefore desirable to avoid fragmentation of ABR packets.

A problem with shared channel communication is the avoidance and handling of collisions of data packets transmitted simultaneously by two or more client stations. The problem of avoiding contentions on shared computer networks have been addressed in a variety of ways. One early approach is known as the ALOHA system. ALOHA originated at the University of Hawaii and was initially primarily used for communication using broadcast radio. The communication over a shared cable is also a broadcasting system in that all stations attached to the cable receive any signal that is transmitted over that cable.

One improvement of ALOHA is slotted-ALOHA. In slotted-ALOHA, time is divided into specified intervals and messages may only be sent during these intervals, i.e., no message is allowed to span over interval boundaries. The channel efficiency of slotted-ALOHA is 36%.

For a discussion of ALOHA, slotted-ALOHA and the derivation of the channel efficiency rates see, Tanenbaum, Andrew, *Computer Networks,* second edition, Prentice-Hall, pp. 121–124.

The copending patent application Ser. No. 08/532,918, entitled "High-Speed Data Communications Network System and Method," (hereinafter '918) filed Sep. 22, 1995 by Mehrban Jam and Ran-Fun Chiu, and commonly assigned with the present invention, describes a reservation method for communication on a shared channel. In the method of '918, the time-domain of the up-stream channel is divided into constant time interval slots. The down-stream channel contains control information informing the client stations about the status of each slot. The status is that it is either a contention slot, in which any client station can transmit on the up-stream channel, or a reserved slot, in which only one client station may transmit on the up-stream channel.

In the method of '918, a station $s_i$ having ABR data to transmit waits for an available (contention) slot on the data channel, and transmits to the master station a short reservation message, that fits into a single slot. The reservation message informs the master station about the number of slots $s_i$ needs in order to transmit its ABR packet(s). If two or more stations transmit their reservation messages in the same contention slot, the messages collide with each other, and none of the reservation messages is received by the master station. Collisions are resolved using a collision resolution algorithm, like ALOHA, tree algorithm, etc. If only one station transmits a reservation message in a contention slot, the message is received by the master node. Suppose such a message, requiring the allocation of n slots, is sent by station $s_i$. The master station has a local variable indicating the sequence number of the next non-reserved slot, for example number a. It then updates this variable to indicate that the next available slot is now slot a +n. Then, it sends to $s_i$ on the control channel an allocation message informing $s_i$ that it can start transmitting in slot number a. The allocation message must be received by $s_i$ before slot number a is scheduled on the data channel. If $s_i$ does not receive an allocation message within a pre-determined time interval, it assumes that the reservation collided with another one, and therefore re-transmits the reservation once again sometime later, according to the collision resolution algorithm.

It would be desirable to have a reservation protocol for a shared channel that supports both ABR and CBR data.

Other advantages and features of the invention will be made apparent in connection with the following detailed description.

SUMMARY

A communications system according to the invention has a master station, several client stations, and a shared communications medium connecting the master station to the client stations. The medium has a first communications channel for transmitting control information down-stream from the master station to the client stations, and a second communications channel for transmitting asynchronous Available Bit Rate (ABR) data and synchronous Constant Bit Rate (CBR) data from the client stations to the master station. The master station divides the time domain into a plurality of constant time interval slots. It groups consecutive slots into frames and designating each slot as a contention slot or as a reserved slot. Further, the master station apportions the slots in a frame into a first region of slots in each frame for ABR data and a second region of slots for CBR data. Each client station, when requiring to transmit ABR data, transmits a reservation request in one of the contention slots (which appear only in the ABR region of a frame), wherein the reservation request includes a length field indicating how many reserved slots the client station requires. If in the current frame there are fewer ABR slots remaining than what is required to accommodate the last reservation, the master station determines if the ABR region of the current frame can be expanded to accommodate the reservation. If the ABR region can be expanded, the master station does so, and then contracts the ABR region of a subsequent frame by the same amount.

Certain conditions may make it impossible for the master station to accommodate a reservation packet in the current frame with or without ABR region expansion. The problem arises when a reservation request occurs in one of one or more "sensitive slots." There are at least three solutions to that problem. First, the master station can ignore the reservation request. The client station making the request would not receive an acknowledgment and would resend the request in a later frame. In the second solution, the master station accepts one reservation request in the "sensitive slots" of a frame and defers that reservation to the next frame. Other reservation requests in the sensitive slots of that frame are ignored. In the third solution, for every reservation request received in the sensitive slots of any frame, the master station finds a future frame that can handle that reservation with or without ABR region expansion.

If accommodation of the reservation required ABR region expansion, the master station contracts the ABR regions of other future frames by a total equal to the required ABR region expansion.

If the ABR region contraction required is at least as great as the entire ABR region of a subsequent frame, provided that no reservations have been made in the ABR region, the master station removes the entire ABR region of that subsequent frame.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1A:
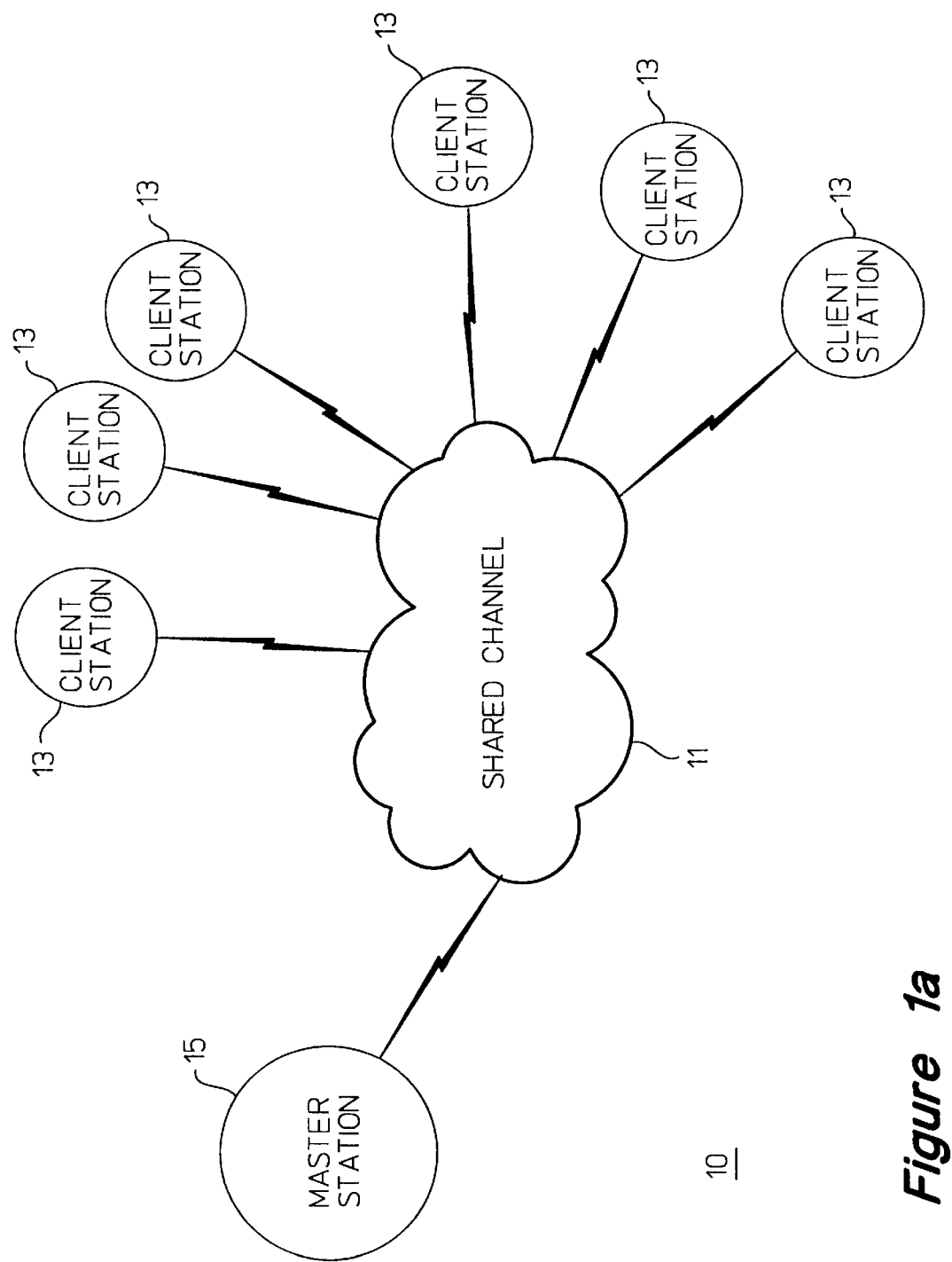
FIG. 1a is a generalized illustration of a communication system having a master station communicating over a shared channel with a plurality of client stations.

FIG. 1a is a generalized view of a communications system 10 having a master station 15 communicating with many client stations 13 over a shared channel 11. The master station 15 may be further connected to other master stations (not shown), network routers (not shown), and other shared communications channels (not shown). Exemplary communication systems 10 include cable TV systems, wireless microwave systems such as LMDS (Local Multipoint Distribution Service), satellite communications, and cellular telephone service.

As shown in the drawings, for purposes of illustration, the invention is embodied in a novel method and system for managing a communications system having a shared communications channel 11. A shared communications channel may support both asynchronous Available Bit Rate (ABR) data and synchronous Constant Bit Rate (CBR) data. Prior art solutions for shared medium networks having a master station and many client stations that do not allow fragmentation of ABR packets provide separate physical channels for the ABR and CBR data. Examples, include Frequency Division Multiplexing (FDM) and Time Division Multiplexing (TDM). In the prior art, part of the bandwidth dedicated to CBR data is wasted whenever the demand for CBR services do not meet the supplied bandwidth.

In accordance with the invention, the master station 15 divides the bandwidth of the shared channel 11 into equal sized time intervals called slots. It further groups consecutive slots into frames and partitions each frame into regions for ABR and CBR data. The master station 15 adjusts the partition between the ABR region and the CBR region to accommodate set-up and take-down of CBR calls. Furthermore, the ABR region is adjusted to accommodate reservation requests for multi-slot packets of ABR data. The ABR region of a frame may be expanded, while deferring the CBR region, to accommodate reservation packets that do not fit in the default sized ABR region. The ABR region of subsequent frames is then contracted so that the average ABR region size remains constant and equal to the default sized ABR region.

As shown in the drawings and explained in the accompanying description, the communications management system of the present invention guarantees each CBR session in addition to guaranteed throughput, an average delay and a maximum delay between successive accesses to the channel 11. Furthermore, one physical channel is used for both CBR and ABR traffic. All the bandwidth not allocated for CBR traffic can be used for ABR traffic. Thus, the bandwidth waste associated with schemes that employ multiple physical channels, like FDM, is avoided.

Turning now to the drawings, the shared medium, connecting the master station 15 to the many client stations 13, has a first communications channel for transmitting control information down-stream from the master station to the client stations, and a second communications channel 11 for transmitting asynchronous Available Bit Rate (ABR) data and synchronous Constant Bit Rate (CBR) data from the client stations 13 to the master station 15. The master station 15 divides the time domain into a plurality of constant time interval slots and groups consecutive slots into frames (e.g., frames 401-1, 401-2, 401-3, 701-1, 701-2, 701-3, 801-1, 801-2, 801-3, of FIGS. 4, 7, and 8). Each frame is subdivided into a region for ABR data (e.g., 407-1) and a region for CBR data (e.g., 408-1). The master station 15 designates each ABR slot as a contention slot or as a reserved slot. In a contention slot, any of the client stations 13 is allowed to transmit an ABR packet that fits into a single slot, or a reservation for dedicated ABR slots. The type of each slot (contention or reserved) is communicated from the master station to the client stations on the control channel. The reservation requests include a length field indicating how many reserved slots the client station 13 requires.

In response to a reservation request for ρ slots, the master station 15 compares the length ρ to the number of ABR slots remaining and not yet allocated in the current frame, ρ'. If, accounting for any propagation delay, there are enough remaining ABR slots in the current frame to accommodate the request, the master station 15 will allocate the requested number of slots, and inform, via the control channel, the client station 13 how many slots to wait for prior to beginning its ABR transmission burst.

If the reservation request cannot be accommodated in the current frame, the master station 15 determines how much ABR region expansion would be necessary to accommodate the reservation request. In most cases, the master station 15 then expands the current frame by that amount. In certain cases, such expansion is not possible. There are at least three ways of dealing with that eventuality. This problem and the solution thereto is discussed in greater detail below, in conjunction with FIG. 6 and the examples of FIGS. 4, 7, and 8.

Finally, the master station 15 contracts the ABR regions of future frames by a total equal to the ABR region expansion. While processing these future frames, additional reservation requests and associated ABR region expansion may occur. The master station 15 keeps track of the total contraction needed and contracts future ABR regions sufficiently to cause the average CBR region size to be constant over time.

Figure 1B:
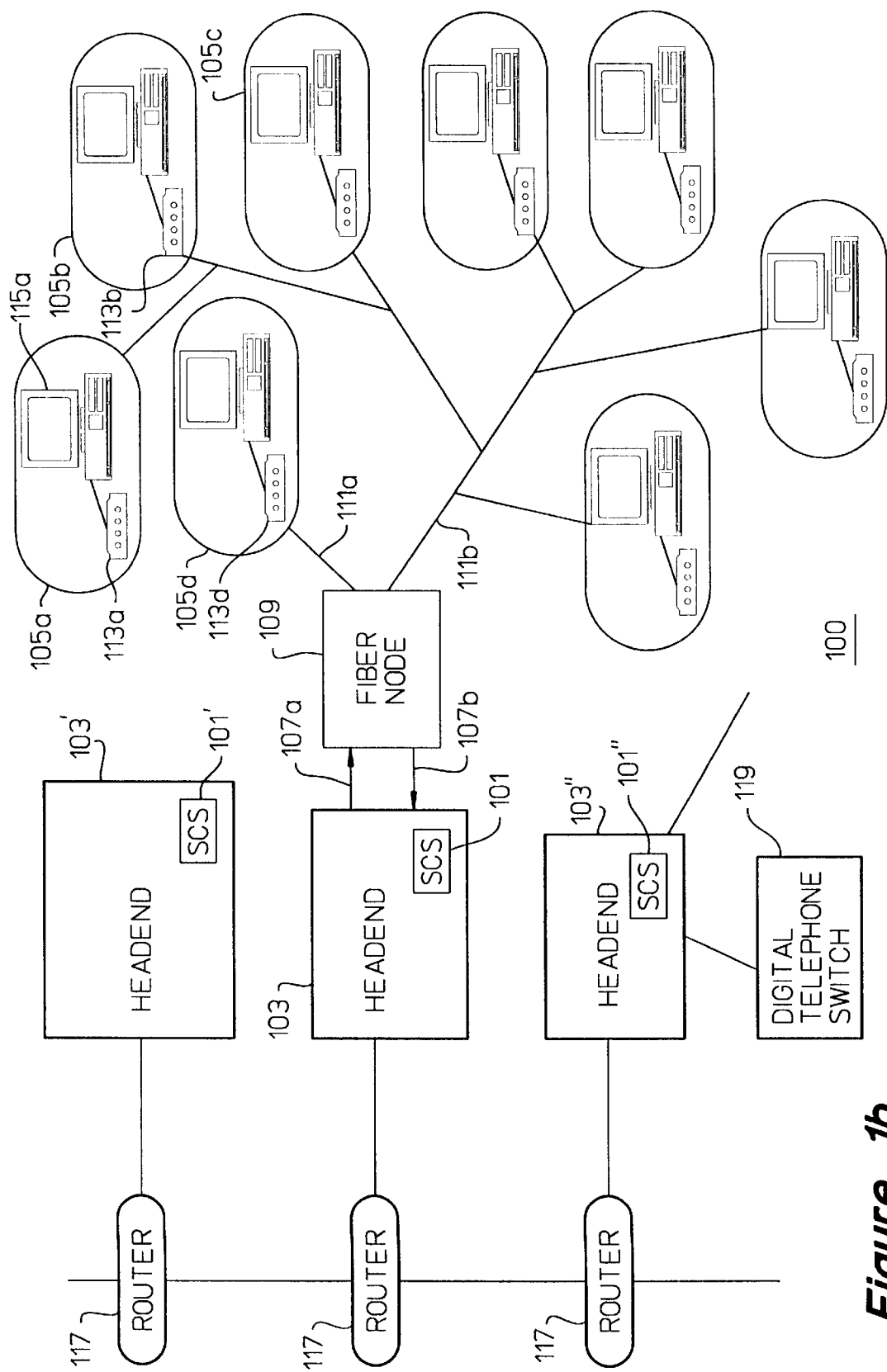
FIG. 1b is an illustration of a neighborhood cable TV system adapted according to the present invention to provide data-communication between a Signal Conversion System (SCS) located at the head-end and client stations located at the subscriber locations over a shared channel on a cable.

FIG. 1b is a more detailed illustration of an exemplary communications system with a shared channel, namely, a neighborhood cable TV system 100 to provide data-communication between a Signal Conversion System (SCS) 101 located at a head-end 103 and client stations 105 (e.g., 105a–d) located at subscriber locations. Each SCS 101 is connected to a packet router 117 that routes data packets to and from remote server stations. In an alternative connection scheme, an SCS 101, e.g., 101", interfaces locally or remotely to a circuit switch 119 for circuit switched constant bit rate services. The latter may be used to provide a digitized voice connection to a telephone network.

In many cable TV systems about 500 to 2000 subscribers are attached to the same headend 103. The headend 103 communicates with the various subscriber locations 105 via optic fiber cables 107a and 107b connected to a fiber node 109. The fiber node 109 is further attached via coaxial cables 111a and 111b to many subscriber stations 105. The fiber node 109 contains a mechanisms for converting between optical and electrical signals. The connections between routers 117 and the SCS's 101 is communicated in a digital form. However, the communication between the headend 103 and the subscriber locations is in an analog form.

Each client station 105 contains a Cable Modem (CM) 113 connected to a computer 115. In alternative embodiments the computer 115 is substituted with other devices that would benefit from data communication with the headend 103 over the cable 111. Examples, of such alternatives include set-top boxes for making requests for particular cable TV operations, e.g., video-on-demand type services, and interactive television.

One role of the SCS 101 is to provide a signal conversion between the digital communications that occur in between routers 117 and the analog communications on the optic fiber and coaxial cables of a Cable TV system. Furthermore, the SCS 101 is an example of a master station 15 with responsibility for scheduling upstream transmissions from the cable modems 113. The upstream communication from the cable modems 113 is via a shared channel on the cable 111. Thus, this shared channel is equivalent to the shared channel of FIG. 1a. Similarly, the cable modems 113 are specific examples of client stations 13 of FIG. 1a.

Figure 2:
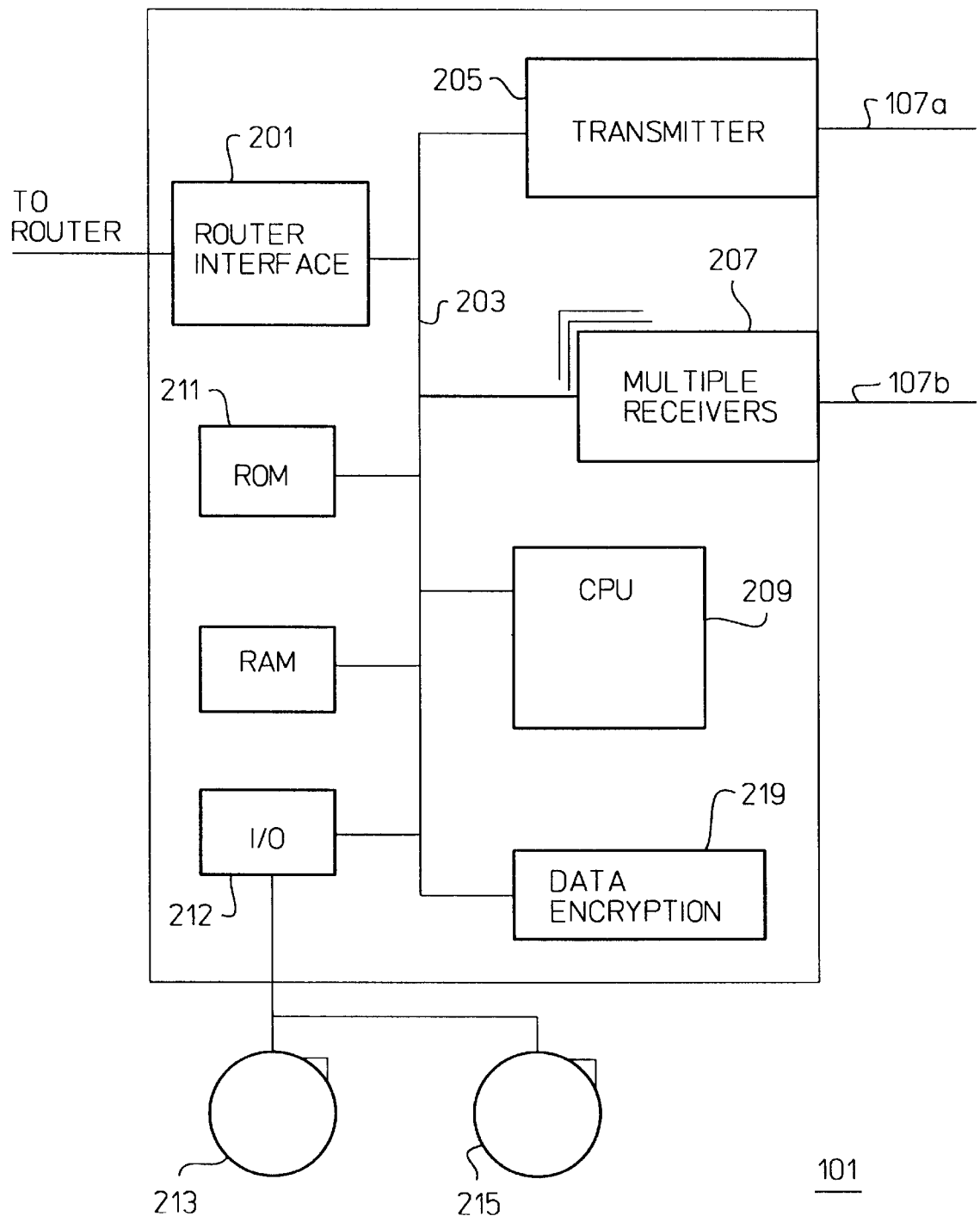
FIG. 2 is a schematic of Signal Conversion System (SCS) according to the present invention.

FIG. 2 is a block diagram of the Signal Conversion System (SCS) 101. The Signal Conversion System (SCS) 101 is attached to the fiber cables 107a and 107b. Using a transmitter 205 the SCS 101 transmits data onto the fiber cable 107a. Using multiple receiver 207, the Scs 101 receives data on several channels on the fiber cable 107b. This data may be transmitted using one of many data formats, e.g., QAM64, QAM256, QPSK. Accordingly, the transmitter 205 and receivers 207 contain the required modulators and demodulators.

The SCS 101 contains a router interface 201 that is connected to a router 117. The router interface 201 receives and transmits digital data packets, for example Internet Protocol (IP) packets, or ATM cells, to the router 117. The router interface 201 is connected to the internal bus 203 for transferring data to and from other components of the SCS 101.

A Central Processing Unit (CPU) 209 manages the conversion of data between QAM64, QPSK, and the digital packet format of the router interface 201. The CPU 209 also directs data traffic on the bus 203. Both transmitter 205 and receiver 207 are connected to a SCS bus 203. Much of the data transmitted and received on cables 107a and 107b require extensive processing and formatting. The CPU 209 is responsible for this processing and formatting. Many of the procedures and data used for controlling the operation of the CPU 209 are stored in a ROM 211 connected to the bus 203. A RAM 213 for storing data during processing and retransmission is further connected to the bus 203. Other procedures for controlling the operation of the SCS 101 and its components such as CPU 209 are stored in secondary storage devices 213 and 215, both connected to the bus 203 via an I/O unit 217.

Figure 3:
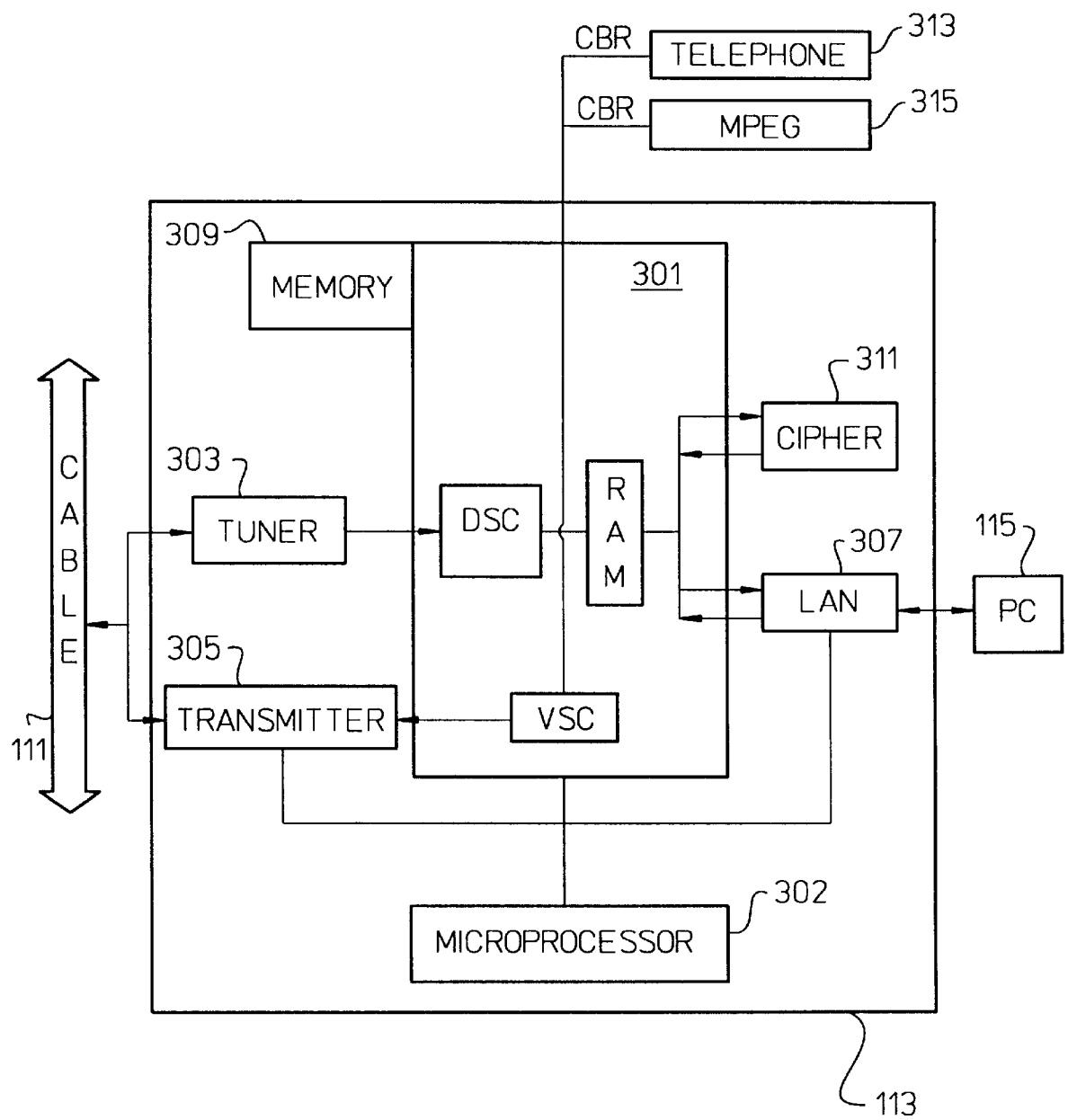
FIG. 3 is a high-level schematic of a cable modem used in accordance with the cable TV system of FIG. 1.

FIG. 3 is a high-level schematic diagram of the Cable Modem (CM) 113 connected to a cable 111 and a Personal Computer (PC) 115. The CM 113 receives data signals from the cable into a tuner and demodulator 303 and transmits data signals onto the cable by a transmitter 305.

The CM 113 is responsible for filtering signals transmitted between the PC 115 and the cable 111, for encrypting/decrypting these signals (as necessary), for buffering data, and for translating between the communication protocol for on-cable transmissions and for modem-to-PC transmissions. These and other functions (as discussed below) are accomplished by a variety of component circuits. The heart of the CM 113 is a control circuit 301. The control circuit 301 is connected to the other component circuits, and with the aid of a microprocessor 302 controls timing, and device sharing among the various other component circuits.

The communication between the CM 113 and the PC 115 is accomplished by a Local Area Network (LAN) transceiver circuit 307. The LAN circuit is connected to the control circuit 301. In the preferred embodiment, the particular I/O interface between the CM 113 and the PC 115 uses the 10-baseT protocol, but other modem-to-PC protocols are acceptable alternatives. In alternative embodiments, other LAN protocols, such as the Hewlett-Packard Company 100 BaseVG protocol may be used.

Information transmitted between the PC 115 and the cable 111 are buffered in the cable modem in a random access memory 309 connected to the control circuit 301. This data from the PC may be in the form of Ethernet-like packets to be transmitted as ABR data to SCS 101. As discussed below, communication between the CM 113 and the cable system is subject to collision with messages being sent by other client stations 105. Furthermore, collisions are avoided by using a reservation system. The collision handling and reservation system is transparent to the PC 115. Therefore, while waiting to be transmitted a message is buffered in the RAM 309. Furthermore, additional processing of an incoming or outgoing message is required by the CM 113 prior to retransmission to the cable 111 or the PC 115, respectively. Such processing includes encryption and decryption. The encryption/decryption is executed by a cipher circuit 311 connected to the control circuit 301.

The upstream and downstream data transmitted on the cable 111 may also contain constant bit rate (CBR) data. The upstream CBR data is sent from the CM 113 on the same physical channel as the ABR data. The CBR data may originate from telephone equipment 313 for voice signals or from an MPEC interface 315 for video signals. One application for such CBR communication of voice and video is video-conferencing.

Communication over the cable 111 is possible by using frequency multiplexing techniques over a frequency range from 5MHz to 750MHz. Standard TV channels are usually transmitted in the above 54MHz range. Each such channel is 6MHz wide. Typically the below 50MHz frequencies are unstructured and very noisy. In the preferred embodiment, up-stream communication (communication from the CM 113 to the SCS 101) occur on a 2MHz wide frequency band in the 5 to 42MHz frequency spectrum, and down-stream communication (from the SCS 101 to the CM 113) occur on a standard 6MHz wide TV channel in the 54MHz and above range, and is referred to hereinafter as the down-stream channel. Thus, the 5 to 42 Mhz band serves as the spectrum in which a communication channel from the client stations 105 to the SCS 101 can be selected and the band above 54MHz serves as the spectrum from which communication channels from the SCS 101 to the client stations 105 can be selected.

The upstream channel 11 is shared among many client stations 13. To effectively share the upstream channel 11, a collision resolution and reservation method is used. The master station 15 sends, on the down-stream channel, a short control packet with information about each slot in the upstream channel 11. This mini-slot contains designations of the slot as a contention slot or as a reserved slot. Each reserved slot is dedicated to a particular client station.

Alternative embodiments provide for multiple communication channels in each direction. Such alternatives are natural extensions of the described preferred embodiment and are within the scope of the present invention. For illustrative purposes, the present invention is described in the context of the one-channel per direction embodiment. However, a person skilled in the art will realize how to apply the invention to the multiple-channel alternatives.

Figure 4:
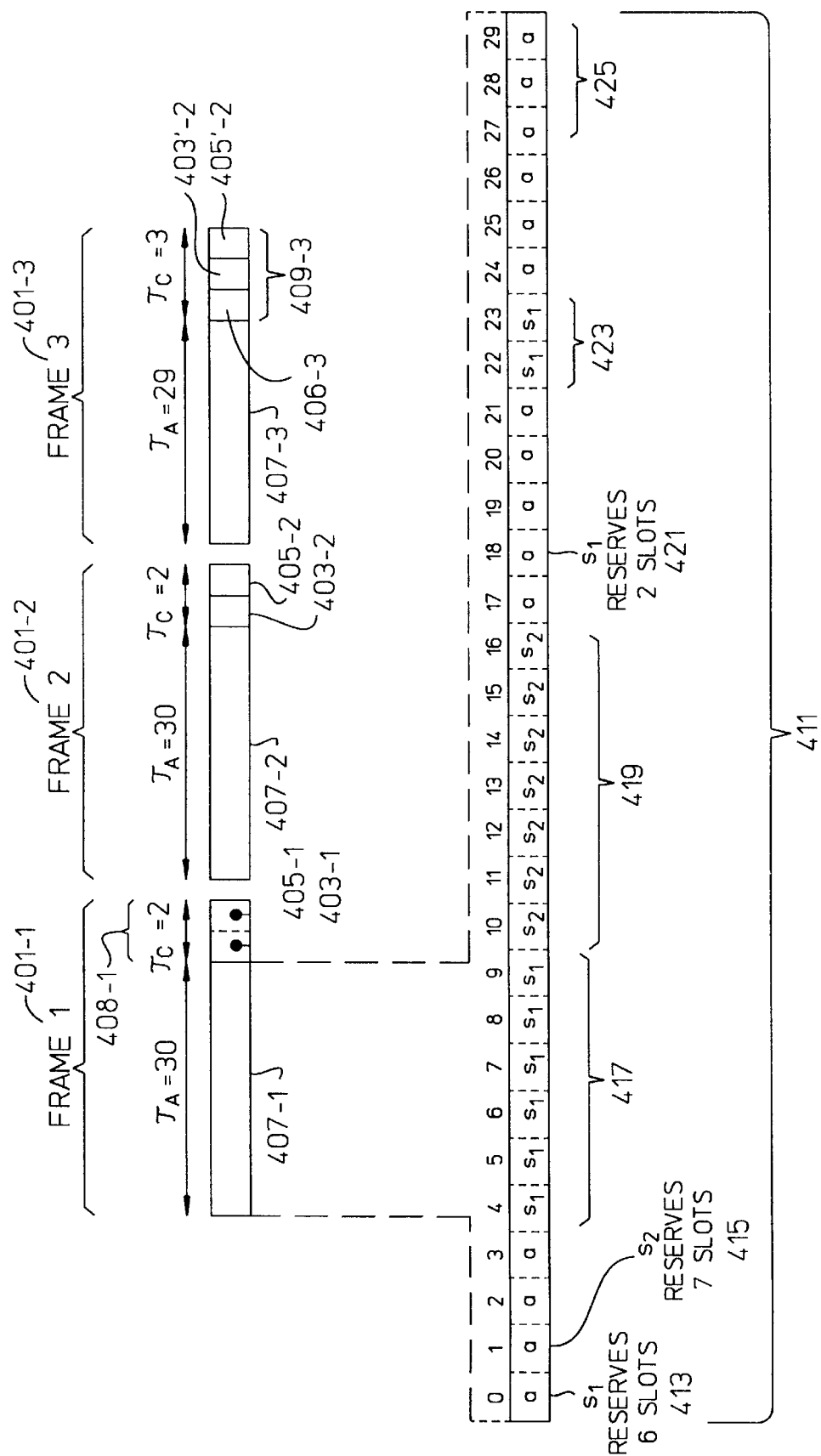
FIG. 4 is a first exemplary illustration of availability status of slots on the shared up-stream channel.
Figure 7:
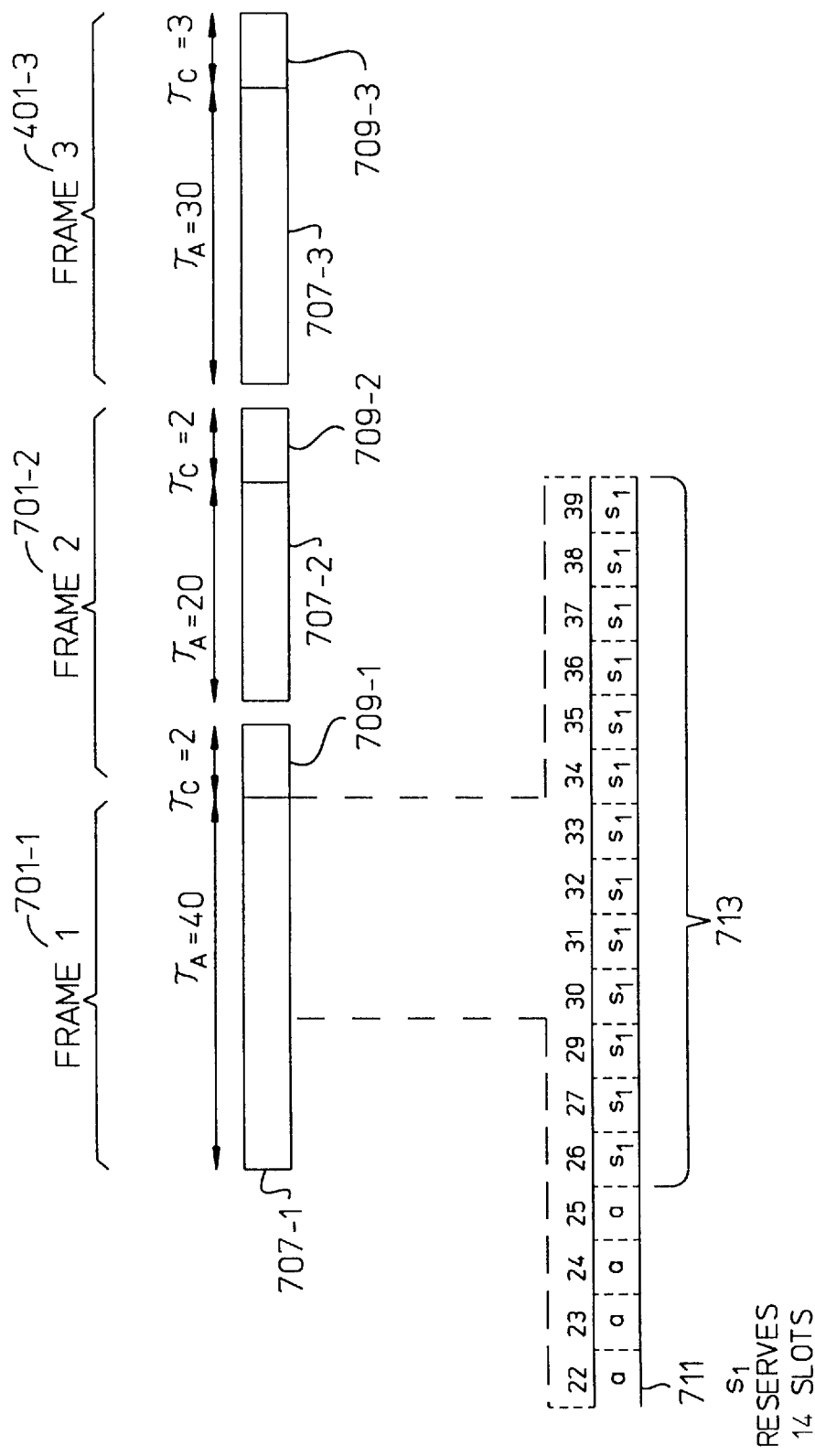
FIG. 7 is a second exemplary illustration of availability status of slots on the shared up-stream channel.
Figure 8:
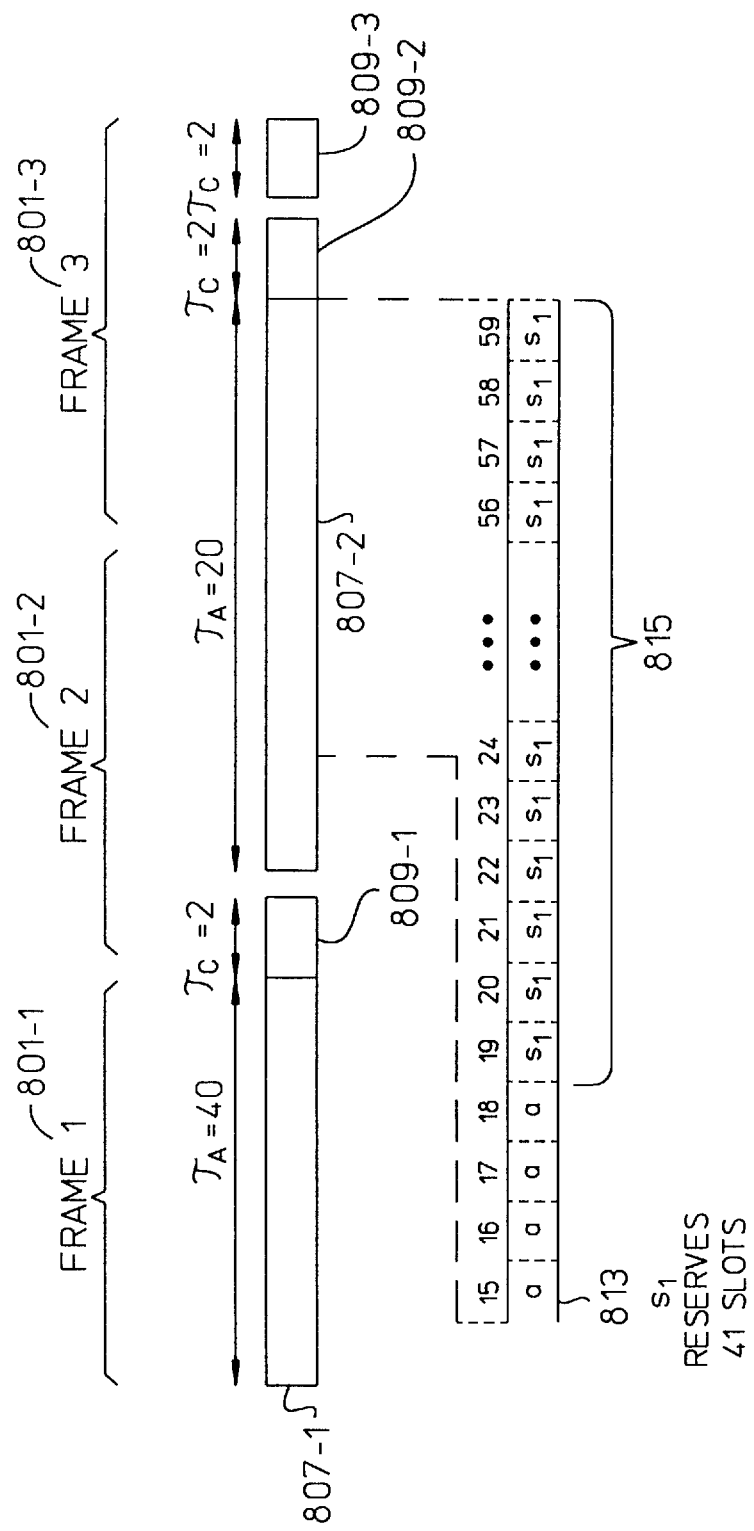
FIG. 8 is a third exemplary illustration of availability status of slots on the shared up-stream channel.

Turning now to FIG. 4, an exemplary illustration of the time-domain of the upstream channel 11. First a note on numbering: In the examples of FIGS. 4, 7, and 8, the following numbering convention has been adopted. Each like element has the same three-digit reference numeral, followed by a sequence number, separated from the reference numeral by a dash. For example, in FIG. 4, all frames are numbered 401, and 401-1 is the first frame in the exemplary sequence, 401-2, the second, and 401-3, the third. Similarly, 403-1 is a CBR slot in frame 1, and 403-2, is the corresponding CBR slot in frame 2. Other elements that are similarly numbered include the ABR regions 407, frames 701, ABR regions 707, CBR regions 709, frames 801, ABR regions 807, and CBR regions 809.

The time-domain of the upstream channel 11 is divided into even sized slots. In this example, thirty of these slots are shown as element 411. The consecutive slots are grouped together in units called frames, e.g., Frame 1, Frame 2, and Frame 3, shown as elements 401-1, 401-2 and 401-3. Each frame 401, is divided into two regions, a region for ABR data 407 and a region for CBR data 409. In the example of FIG. 4, the default size of the ABR region is 30 slots and the size of the CBR region is two slots.

Each slot in the CBR region is dedicated to provide synchronous service for a particular client station. Thus, in the example shown in FIG. 4, slot 403-1 is dedicated to a client station $s_i$ and slot 405-1 is dedicated to a client station $s_j$. The dedicated slots for these client stations recur in subsequent frames 401, e.g., slots 403-2, 403-3, 405-2, and 405-3. If a client station signs-on to use a synchronous service, e.g., a user at a client station places a phone call, one or more additional dedicated CBR slots are added to the CBR region, e.g., slot 406-3 in frame 3 and subsequent frames. The number of slots added by a call set-up depends on the service requirements. Similarly, if a client station no longer needs to use a synchronous service, the dedicated slots for that client station is removed from the CBR region of subsequent frames.

Figure 5:
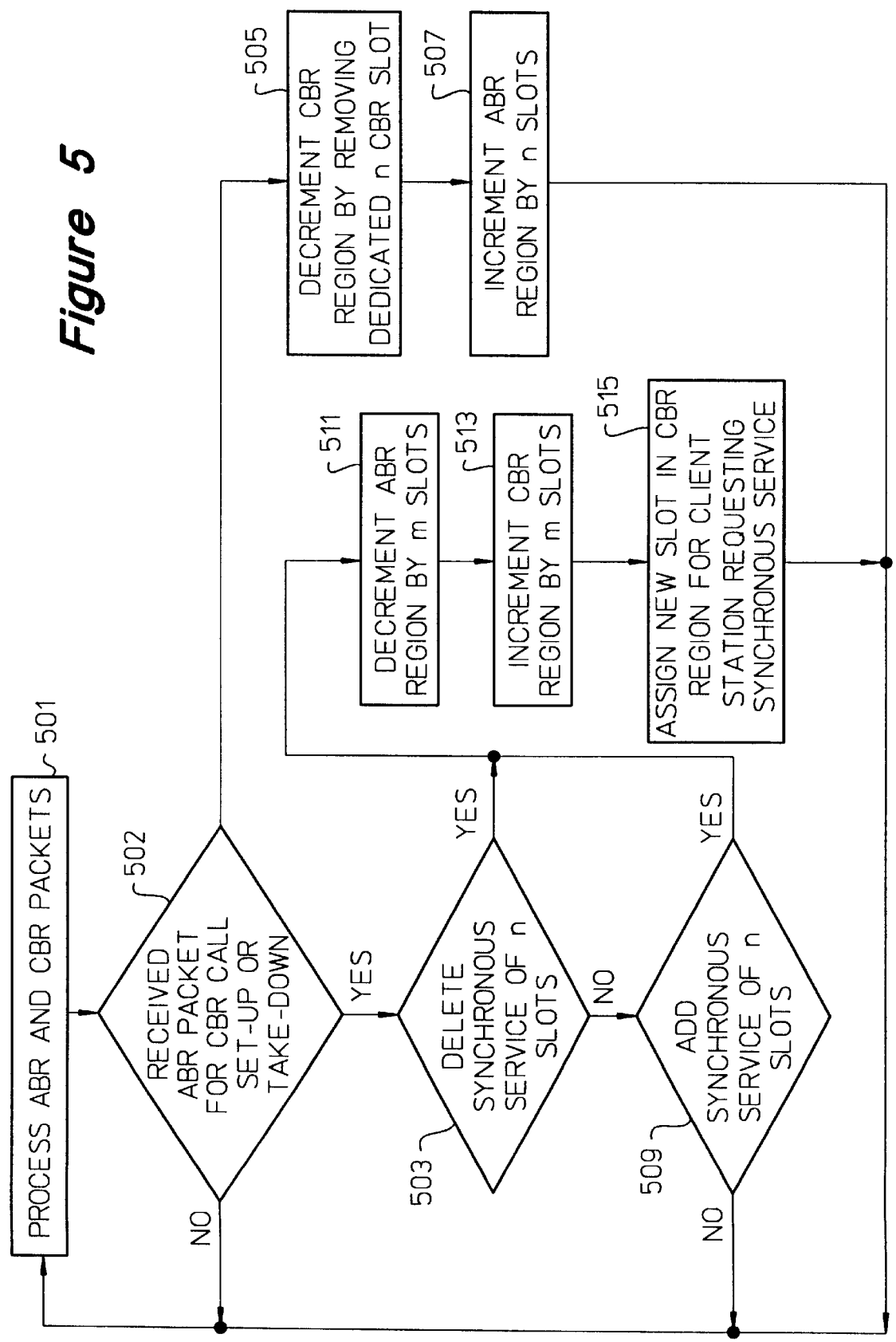
FIG. 5 is a flow-chart illustrating the method of the invention for allocating and deallocating sub-channels for synchronous traffic on the shared channel.

The process of adding and deleting CBR slots to provide or discontinue synchronous service is illustrated in the flow chart of FIG. 5. In step 501 the master station is processing ABR and CBR packets. In step 502, the master station 15 determines whether an ABR packet contains a request for a CBR call set-up or take-down. If it is not such a packet, the master station can continue to process additional packets, 501. Otherwise, if the master station 15 encounters a request to terminate a CBR call, 503, the master station 15 proceeds to decrement the CBR region by removing all the CBR slots that are dedicated to the cell being taken down, 505, and to increment the ABR region by the same number of slots, 507. If the master station encounters a request to add a CBR call from a client station, 509, the master station decrements the ABR region by the number of slots needed by the call, 511, and increments the CBR region by the same amount, 513. The added slots in the CBR region are then assigned to the requesting client station, 515.

The master station 15 assigns a station with synchronous traffic a CBR sub-channel for the duration of the synchronous call. The sub-channel is a recurring n slots in the CBR region of consecutive frames, e.g., (for n=1) slots 403-1, 403-2, 403-3 or slots 405-1, 405-2, 405-3. The CBR sub-channel enables periodic access for the station to the network bandwidth with a guaranteed average delay $T_{average}$ and a guaranteed maximum delay $T_{max}$ between successive transmissions. The length of $T_{average}$ can be very short (for example, less than 1 ms), whereas $T_{max}$-$T_{average}$ is equal to the longest asynchronous (ABR) burst that a single station is allowed to transmit following a single reservation request. For example, suppose that every contending station is allowed to reserve ABR slots for only one Ethernet-like packet in each reservation request. That restriction implies that the longest asynchronous burst a single station can transmit following a single reservation request is equal to the size of the longest Ethernet packet, namely 1518 bytes. Such a packet can be transmitted in 32 slots of a 48-byte slotted network. If the transmission rate in the data channel is 3Mb/s, the maximum asynchronous frame duration is 32*48*8/(3*106)=4ms. Therefore, for this example $T_{max}$= $T_{average}$+4ms. The method of the invention for processing reservation requests, discussed below in conjunction with the flow chart of FIG. 6 and the examples of FIGS. 4, 7, and 8, illustrates how this result is achieved.

The default number of slots in the ABR region and in the CBR region depends on the percentage of bandwidth needed to be assigned for each traffic class. Suppose that on the average (as a default) each frame has $\tau_c$ CBR slots and $\tau_a$ ABR slots. It follows that $T_{average}=\tau_c+\tau_a$ slots, that a fraction of $\tau_c/(\tau_c+\tau_a)$ of the data channel bandwidth is assigned to CBR traffic, and that the remaining $\tau_a/(\tau_c+\tau_a)$ of the bandwidth is assigned to ABR traffic. The values of $\tau_c$ and $\tau_a$ are adjusted by the master station 15 from time to time in order to accommodate new set-up requests of CBR calls (by increasing $\tau_c$), tear-down requests of CBR calls (by decreasing $\tau_c$), or in order to change $T_{average}$ (for instance, by decreasing $\tau_c$ and $\tau_a$ by the same factor, the master station 15 decreases the average delay between successive accesses to the CBR channel without affecting the percentage of bandwidth assigned for each traffic class).

In the example of FIGS. 4, 7, and 8, the initial value of $T_a$ is 30 slots and the initial value of $T_c$ is two slots. In other words, each frame, on average, has an ABR region of 30 slots, and a CBR region of two slots. Of course these values are arbitrarily selected for illustrative purposes and in application may be very different.

Figure 6:
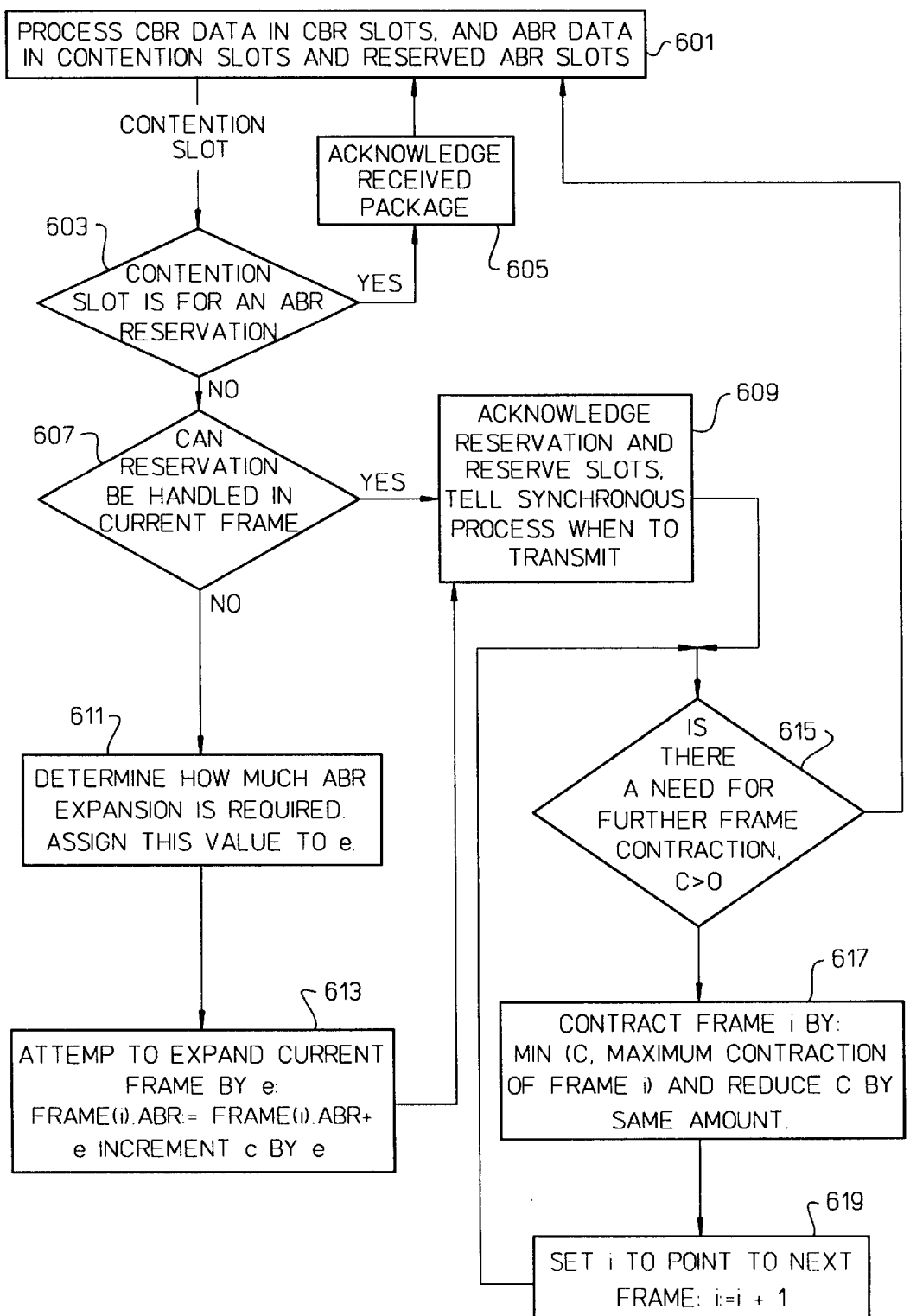
FIG. 6 is a flow-chart illustrating the method of the invention for expanding and contracting ABR regions on the shared channel to accommodate different length ABR packets.

FIG. 6 is a flow chart illustrating the method followed by the master station 15 for dealing with reservation requests according to the invention. In step 601 (same as step 501 of FIG. 5), the master station 15 processes ABR and CBR slots. Returning to FIG. 4, element 411 provides a detailed view of the ABR region 407-1 of Frame 1 (element 401). Each of the slots in ABR region 407 is labeled with its status. If labeled with an 'a,' the slot is available as a contention slot, if labeled with a client station designation, e.g., '$s_1$,' then the slot is reserved for the indicated client station. In the example of FIG. 4, in slot 0 (413) station $s_1$ requests a reservation for six slots and in slot 1 (415) station $s_2$ request a reservation for seven slots.

If the received packet is not a reservation, the master station 15 acknowledges a successful receipt of the packet, 605, and returns to processing ABR and CBR slots in step 501.

If the packet is a request for a reservation of ABR slots, one of three situations arise: (1) the reservation can be handled in the ABR region of the current frame without expanding that region, (2) the reservation can be handled in the current frame by expanding the ABR region, or (3) the reservation cannot be handled in the current frame.

Therefore, the master station 15 determines whether the reservation can be handled in the current frame without expanding the ABR region, 607. This determination depends upon whether there are at least as many unreserved slots remaining in the ABR region 407 as are required to accommodate the reservation. If the reservation can be thus accommodated, the master station 15 sends the requesting client station 13 an acknowledgment of the reservation, 609, without doing any further processing in terms of adjusting the ABR region. In the example of FIG. 4, $s_1$'s reservation is made in slot 0 of Frame 1. At that point in time, all slots of the ABR region of Frame 1 are available. To account for a propagation delay, the master station knows that $s_1$ cannot be guaranteed to receive an acknowledgment until after a certain number of slots, Δ, after the slot where the reservation was transmitted (in the example of FIG. 4, and subsequent examples, Δ=3). Because Δ=3, slots 4 through 9 are reserved for $s_1$. The master station 15 sends on the control channel an acknowledgment message directing $s_1$ to begin transmitting its ABR burst in slot 4. In slot 2 (element 415) $s_2$ requests seven reserved slots. Having already assigned 4 through 9 (element 417) to $s_1$, the master station 15 reserves slots 10 through 16 (element 419) for $s_2$ and directs $s_2$ to begin its ABR burst in slot 10.

FIG. 7 is an illustration of the time-domain of the upstream channel 11 providing an example of the expansion of the ABR region to accommodate a reservation packet. If the master station 15 determines that the reservation cannot be handled in the current frame, 607, the master station 15 determines how much the ABR region would need to be expanded to accommodate the reservation request, 611.

In the example of FIG. 7, in slot 22 (element 711) client station $s_1$ makes a request for 14 slots. Because the default size of the ABR region 707, $\tau_a$, for each frame is 30 slots (as in the example of FIG. 4) the current frame (Frame 1, element 701), cannot accommodate the reservation without expansion of the ABR region 707-1. A request in slot 22 cannot be acknowledged until after Δ slots have elapsed (in these examples Δ is 3), therefore the first slot in which $s_1$ could start communicating is slot 26. However, because $\tau_a$ is 30, there are only four slots left. Therefore, the ABR region of the current frame must be expanded by the difference in reservation length, ρ, and the remaining slots ρ' of the planned ABR region less Δ, 611. In the example of FIG. 7, the number of remaining slots in the planned ABR region beyond slot 22 (where the reservation was made) is seven. Taking away Δ, leaves four slots. Therefore, ρ' equals four (ρ'=4). The amount of the reservation ρ is fourteen (14). The amount of expansion is ρ-ρ' is ten (ρ-ρ'=14-4=10). Therefore, in the example of FIG. 7, the ABR region of Frame 1 (element 701) is expanded to 40.

Regardless of whether the reservation is handled through expansion or without expansion, the reservation request is acknowledged, 609. Thus, after having expanded the frame, 613, an acknowledgment of the request packet is transmitted to the client station making the request, 609. The acknowledgment includes an indication to the client station 13 of when to begin the ABR transmission burst.

When the CBR region of a frame has been scheduled, i.e., there are no more available contention slots in the ABR region that could cause expansion and corresponding deferral of the CBR region, the master station 15 transmits to each client station 13, that has been assigned slots, a message, in a short control packet on the downstream control channel, indicating when that station 13 can transmit its CBR data.

If the ABR region of a frame has been expanded, 613, the average frame length is held constant by contracting frames other than the frame being expanded. The master station 15 keeps track of the amount of contraction needed in a register c. Therefore, in step 613, the master station 15 also adds the amount of expansion to the value of c.

The amount of expansion is compensated for by contracting ABR regions of subsequent frames. Therefore, the master station 15 checks to determine whether there is further need for contraction of subsequent frames, i.e., the master station 15 determines if the value of c is greater than zero, 615.

If there is a need for further contraction, the frame pointed to by i (initially the current frame plus one) is contracted, 617. Consider the example of FIG. 7. As discussed above, Frame 1 (element 701-1) was expanded by 10 slots to accommodate the reservation request from station $s_1$ in slot 22. Consequently, the CBR part of the frame is deferred. Now consider the ABR region of the second frame, 701-2. In order to compensate for the "overdraft" of 10 slots in the previous frame, 701-1, the master station 15 decreases the ABR region 707-2 of the second frame to 20 slots (30–10). After this contracted ABR region 707-2 the two CBR slots 703-2 and 705-2 are scheduled.

Furthermore, the value of c is reduced by the amount the frame was contracted, 617. In the case of the example of FIG. 7, there is no need for further contraction because the expansion of Frame 1 is equal to the contraction of Frame 2.

Consider FIG. 8. Suppose that the contents of the ABR cells in the first frame are as in the illustration of FIG. 7, i.e., following the expansion of the ABR region in the first frame, the planned size of the ABR region 807-2 in the second frame is 20 slots. FIG. 8 shows the contents of these slots starting in slot 15. In slot 15 station $s_1$ makes a reservation for 41 slots. The master station 15 can schedule station $s_1$ to start transmitting in slot 19 (15+Δ+1). Thus, in order to accommodate this reservation, the length of the ABR region 807-2 must be extended to 60. This brings the aggregate overdraft of the ABR channel to 40 slots. Because this overdraft is larger than the default size of the ABR region $\tau_a$ (30), the third frame has no ABR slot. Removing the entire ABR region of the third frame 801-3 guarantees that the maximum delay of synchronous traffic will be bounded. By skipping the ABR part of the third frame 801-3, the ABR overdraft is reduced from 40 to only 10 slots. Therefore, additional contraction is necessary, 615. Thus, the planned length of the ABR region of the next frame is twenty slots (30–10=20). Whether the actual length will indeed be twenty or more depends on the pattern of reservation requests made by the client stations 13 in the contention slots of that next frame.

As discussed above, in certain situations the current frame may not be able to handle the reservation request with or without ABR region expansion. The two examples of FIG. 4 and 7 show that in any frame there exist Δ "sensitive" contention slots, located either at the end of the frame or before the last burst of reserved slots. A reservation request during a "sensitive slot" cannot be accommodated in the current frame.

The situation where the "sensitive slots" are located in the end of the frame is shown in FIG. 4. Because Δ=3 slots, the master station should determine the status of slot 30 when slot 26 is scheduled. Because there is no pending reservation, the master station determines that slot 29 will be the last one of the ABR region and that the following slot (30) will be assigned to station si, the owner of the first CBR slot 403, according to the original schedule. The master station transmits on the control channel a message (similar to an acknowledgement of a contention slot-communicated packet) notifying si that it can transmit its synchronous data in slot 30. In addition, the master station 15 sends on the control channel a message (that can be incorporated into the previous one) notifying all the regular stations that slot 30 is reserved (the master station 15 send such a message regarding every reserved slot, regardless of whether the slot is in the ABR or CBR region). The same procedure is done by the master station for slot 31, which allocated to $s_j$. Hence, any reservation made by the stations in the last Δ slots of the ABR part of this frame cannot be accommodated in the ABR part of the current frame.

As show in the previous example, when an ABR region is not expanded beyond the planned size, its last Δ slots are "sensitive." When an ABR region is expanded, its "sensitive slots" are the Δ slots following the last reservation request. This situation is shown in FIG. 7. In the first frame 701-1 slots 22–25 are available for contention. Station $s_1$ makes a successful reservation in slot 22. Due to this reservation, as discussed above, the master station 15 needs to extend the length of the ABR region. The maximum extension the master station needs to do due to a single reservation request is equal to the size L (in slots) of the maximum sized asynchronous frame. If, however, more reservations are accepted, in slots 23–25, the length of the ABR region has to be extended accordingly. In the worst case, this expansion may cause the master station to extend the ABR region of a frame by Δ·L slots, and $T_{max}$ will be larger than $T_{average}$ by Δ·L slots, rather than by only L slots. If this increase of $T_{max}$ by (Δ–1)·L slots has a negative effect on the Quality of Service (QOS) of the CBR calls, the Δ slots following the last reservation are regarded as "sensative slots" as well.

Figure 9:
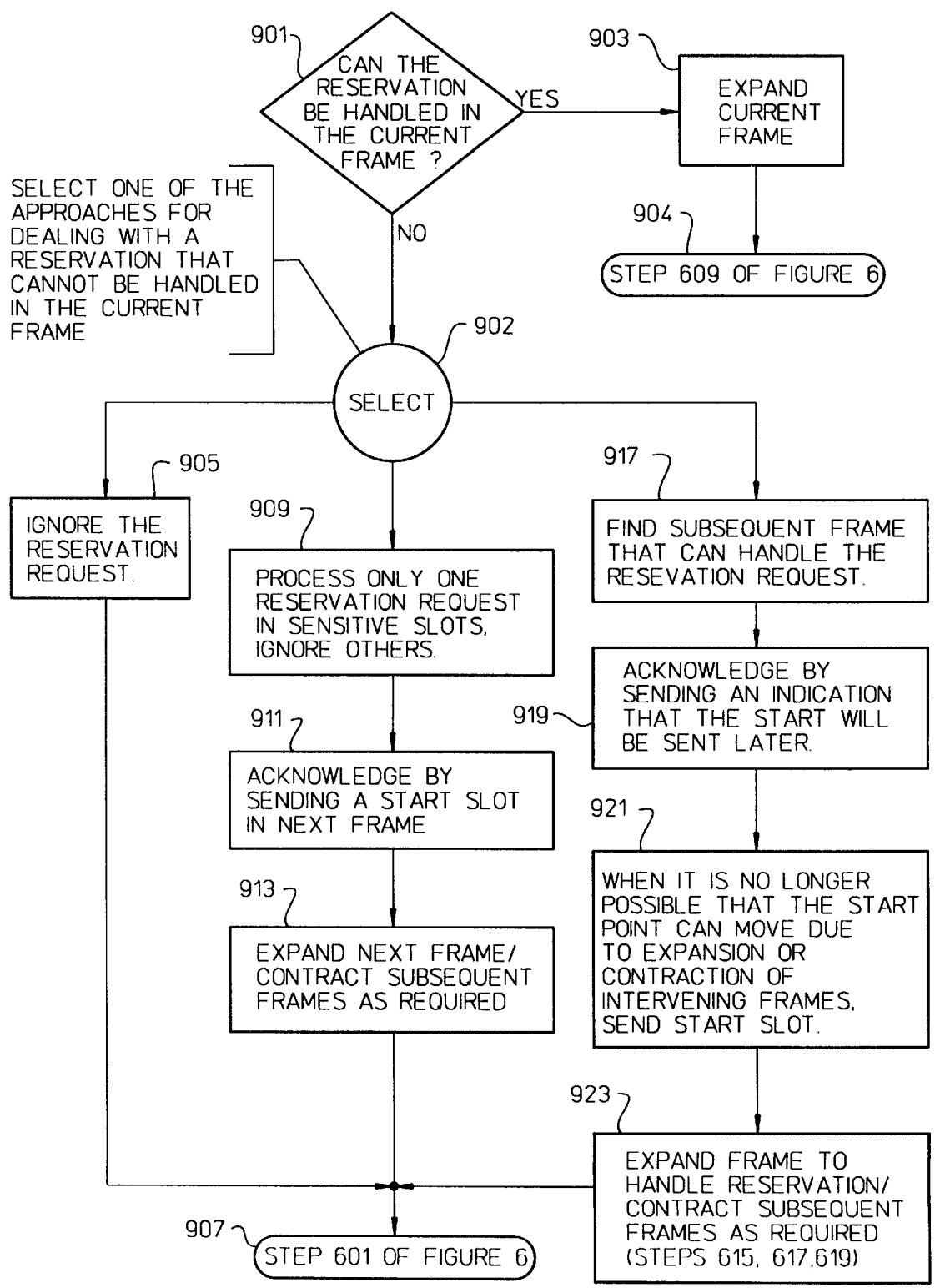
FIG. 9 is a flow chart illustrating three different approaches to handling situations wherein the ABR region of a current frame cannot be expanded to accommodate a reservation request.

There are three methods of dealing with a reservation request that are received in "sensitive slots" and therefore cannot be accommodated in the current frame. FIG. 9 is a flow-chart showing these three methods.

If a reservation can be handled in the current frame, 901, it is expanded (if necessary) 903, acknowledged and contracted (as show in FIG. 6, including and following step 609), 904.

If the reservation cannot be handled in the current frame, 901, one of the three approaches for dealing with such reservations is selected, 902. This selection can be made on a system basis, e.g., depending on the typical packet size and propagation delay.

In the first approach, 905, the reservation request is merely ignored. If the reservation request is ignored, the client station 13 that made the request will automatically resend the request in a subsequent frame when it fails to receive an acknowledgment. The advantage of this solution is that it can be easily implemented by the master station 15. The disadvantage is that it causes to a loss of $p \cdot \Delta / \tau_a$ of the ABR bandwidth, where p is the probability for an available (contention) slot to contain a reservation message of some client station 13. This probability p is equal to 1 minus the probability that no station will transmit a reservation message in a contention slot minus the probability that two or more stations will transmit a reservation message in the same slot (in which case a collision occurs and none of the reservations is received by the master station). The value of p depends on the contention algorithm (e.g., ALOHA or the tree algorithm). It is theoretically bounded by 0.48 and practically by 0.3.

The second approach, 909–913, for handling the problem while reducing the loss of ABR bandwidth, is to accept only one reservation during the Δ sensitive slots, 909, and ignoring any other reservation requests during the sensitive slots. The reservation request is handled in the next frame whose ABR region is not empty (recall that in FIG. 8 the ABR region of the third frame is empty), 911. If necessary the ABR region of that frame is expanded and subsequent frames contracted, 913. When the value of p·Δ is around 1, then the expected loss of bandwidth due to having two or more successful reservations during Δ "sensitive" slots is negligible, namely, $\max(p \cdot \Delta - 1, 0)/\tau_a$.

If $\max(p \cdot \Delta - 1, 0)/\tau_a$ is large, the master station 15 will have to accommodate more than one reservation during a sequence of Δ sensitive slots, in order to avoid substantial loss of ABR bandwidth. This result is accomplished by the third procedure (steps 917–923).

Through a look-ahead procedure, the master station 15 finds a subsequent frame that can handle the reservation request, 917. Performing look-ahead calculations in order to accommodate the reservations in several future frames should take into account that frame structure (i.e., $\tau_a$ and $\tau_c$) is likely to change when synchronous call are set up or taken down. Thus, if the look-ahead approach is adopted, the master station 15 can do a two-part acknowledgment. The first part informs the contending client station 13 of successful receipt of the reservation (otherwise, the station assumes that the reservations collided with another one, and therefore will re-transmit the reservation once again sometime later, according to the contention algorithm), 919. The second part of the acknowledgment, transmitted in a later slot, sends an allocation message with an exact pointer towards the allocated burst of ABR slots, 921. The ABR region of the frame accommodating the reservation is expanded (if necessary) and subsequent frames contracted, as described above, 923. If a regular, one-part, acknowledgment is used, then the acceptance of future CBR calls will have to be delayed until the backlog of ABR reservations have been handled.

As discussed above, the novel reservation allocation method if the invention can be solely executed by the master station 15. The client stations 13 do not have to know about the length of each frame, and when the channel 11 is "switched" from ABR mode to CBR mode. As in the case where only synchronous data is accommodated, the master station 15 needs to inform the client stations Δ (or more) slots before each slot on the data channel 11 is scheduled whether that slot is available for contention or if that slot is reserved (either for ABR or for CBR). The master station 15 needs to send an allocation message for each synchronous or asynchronous allocation. The only difference between the synchronous allocation and the asynchronous allocation is that for synchronous allocations only one reservation message is received by the master station for the entire call duration, during the call set-up protocol, whereas for asynchronous allocations a separate reservation should be received on a contention slot in the data channel 11 before each allocation.

As stated above, the invention has been described herein in the context of a shared cable communication system in which an SCS 101 acts as the master station 15. The scheduling of ABR and CBR traffic according to the invention is equally applicable to other shared-channel-communications systems. Examples of such systems include satellite communications systems, in which the satellite communicates with a number of earth based client stations. The transmission channel, e.g., one frequency band, is shared among the client stations, and the satellite acts as the master station. Similarly, in a cellular telephone system, the many mobile telephone users in a cell can communicate with a cell-node on a shared channel. The cell-node acts as the master station and the various mobile telephones as client stations. Other examples, include Local Multipoint Distribution Service (LMDS) systems, wherein Customer Premises Equipment communicates with a Hub transceiver on a shared channel, and other radio communications systems.

As a person skilled in the art will realize that numerous modifications and changes may be made to the present invention, it is not desired to limit the invention to the exact construction and operation as illustrated and described. Hence, all suitable modifications and equivalents may be resorted to as falling within the scope of the invention.

I claim:

1. A method of transmitting a first and a second type of data from a client station to a master station via a shared communication channel in a communications system, comprising the steps of:

(A) dividing the channel into a plurality of frames, each having a set of consecutive constant time slots, the slots within each of the frames being apportioned into a first region for the first type of data and a second region for the second type of data;

(B) determining whether available slots in the second region of a current frame can accommodate a reservation request from the client station to transmit the second type of data with a predetermined data length;

(C) expanding the second region into the first region in the current frame to accommodate the reservation request and contracting the second region of subsequent frames by an amount equal to the expansion if the available slots in the second region of the current frame cannot handle the reservation request such that the average size of the second region of the current and subsequent frames remains unchanged.

2. The method of claim 1, wherein the first type of data is synchronous Constant Bit Rate (CBR) data and the second type of data is asynchronous Available Bit Rate (ABR) data.

3. The method of claim 1, further comprising the step of receiving the reservation request in the master station via a contention slot of a frame, thus causing the frame to have a reservation pattern.

4. The method of claim 3, wherein the contracting step in the step (C) further comprises (I) determining whether the reservation pattern for a subsequent frame of the current frame permits contracting the second region of the subsequent frame;

(II) contracting the second region of the future frame as much as the reservation pattern permits;

(III) repeating the steps (I) and (II) for other subsequent frames of the current frame until a cumulative contraction equals the expansion.

5. The method of claim 4, further comprising the step of removing the entire second region of the subsequent frame if the required contraction of the subsequent frame is larger than the second region of the subsequent frame.

6. The method of claim 1, wherein the step (B) further comprises the step of comparing the predetermined data length against the available reservation slots in the second region of the current frame to determine if the available slots in the second region of the current frame cannot handle the reservation request.

7. The method of claim 1, wherein the step (C) further comprises the step of finding a future frame to handle the expansion if the current frame cannot accommodate the expansion.

* * * * *